Nov. 18, 1958 L. LAURU 2,860,514
APPARATUS FOR MEASURING MUSCULAR FORCES
INVOLVED IN VARIOUS MOVEMENTS
Filed Sept. 22, 1955 5 Sheets-Sheet 1

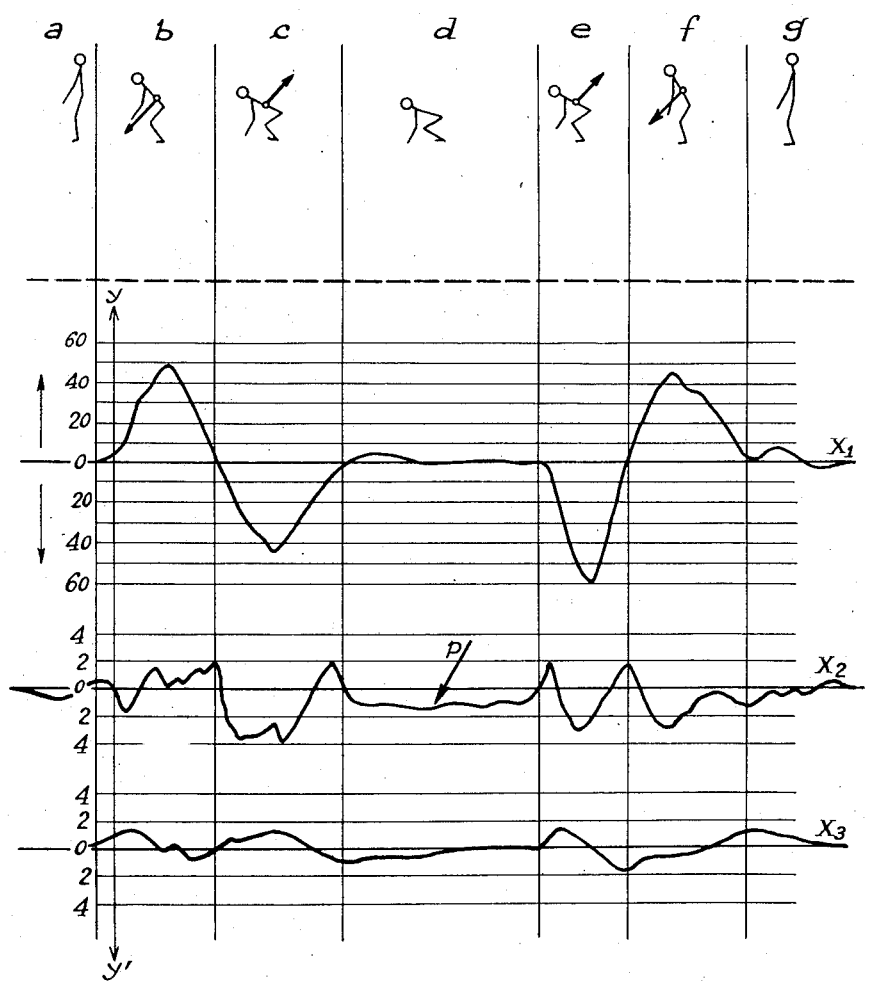

United States Patent Office 2,860,514
Patented Nov. 18, 1958

2,860,514

APPARATUS FOR MEASURING MUSCULAR FORCES INVOLVED IN VARIOUS MOVEMENTS

Lucien Lauru, Paris, France

Application September 22, 1955, Serial No. 535,976

Claims priority, application France June 29, 1955

15 Claims. (Cl. 73—379)

The present invention relates to an apparatus for measuring the muscular forces necessary for the accomplishment of various movements such as for example for determining those logical actions which enable working to take place with the minimum of fatigue and in consequence with the best possible physiological efficiency.

It is one object of the present invention to provide an apparatus which permits of measuring from the center of gravity of the subject the sum of the forces exerted to execute a movement.

An upright motionless subject supports at the level of his center of gravity a force which is his weight.

When the subject becomes active and makes the slightest movement, simultaneously with the unbalancing forces, other forces are created. The latter impart at the center of gravity the sum of the forces developed by the physiological effort, unitarily transferred to the point of postural support, in this instance the ground.

It is another object of the present invention to provide an apparatus which comprises a base plate which supports a flat supporting member and a platform having coupling elements for fixing the said elements to each other in all horizontal directions while permitting a certain degree of relative movement in a vertical direction, one of these elements being supported by means responsive to the extent of vertical reactions to which it is subjected, while the other element is coupled laterally to the base by means responsive to the extent of the horizontal reactions to which the two elements together are subjected.

By this arrangement it will be apparent that it is possible to observe and/or record all the reactions taking place either in a vertical or in a horizontal direction when a subject on the upper platform makes the slightest movement.

It is still another object of the present invention to provide an apparatus, wherein, in a preferred embodiment, the platform rests on a flat supporting member by means sensitive to the value of the vertical reactions while the flat supporting member is supported by the base plate through cables, the extremities of which are preferably carried in supports vertically adjustable in relation to the base plate.

It is yet another object of the present invention to provide an apparatus wherein the means for coupling the flat supporting member with the platform are made of leaf springs disposed in planes parallel to the said supporting member and platform and each having one end fixed flat below the lower side of the platform and the other and fixed flat on the upper face of the flat supporting member.

Preferably the relative movement between the supporting member and the platform is limited by a tie bar having a resilient abutment.

It is a still further object of the present invention to provide an apparatus wherein the means responsive to either vertical or horizontal reactions consist of piezoelectric pick-ups.

It is still another object of the present invention to provide an apparatus, wherein, in a particular embodiment, the base plate and the flat supporting member and the platform are associated with a platform, the upper surface of which is preferably level with the first mentioned platform and has fixing grooves.

In one mode of performance, the said plate carries at least one column with at least one device, such as for example a handle, operable by the person on the upper platform, means, for example, additional piezo-electric pick-ups, being provided for measuring the value of the forces acting on the said device.

It is also another object of the present invention to provide an apparatus wherein the said device is carried by a head which is movable vertically along the column and preferably balanced by a counterweight.

With these and other objects in view, which will become apparent in the following detailed description, the present invention will be clearly understood in connection with the accompanying drawings, in which.

Figure 2:
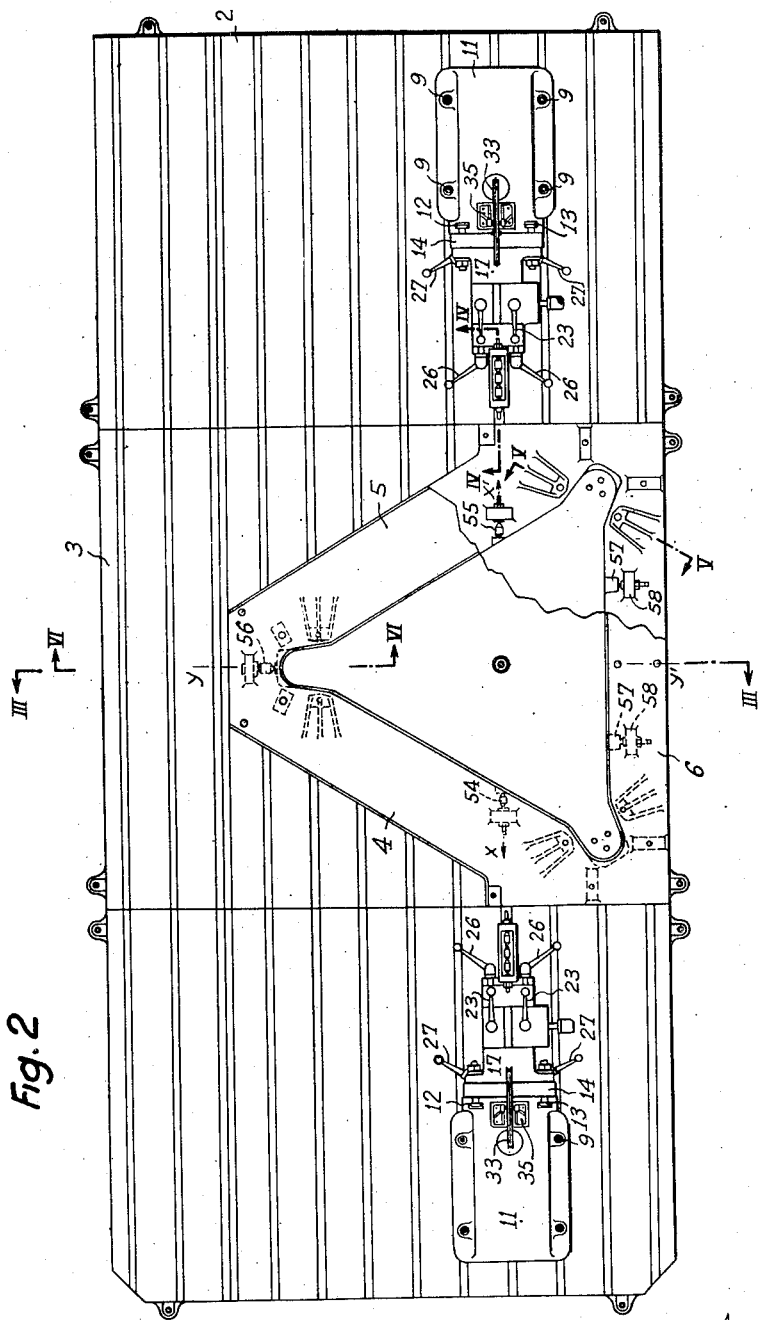
Fig. 2 is a plan view thereof.
Figure 5:
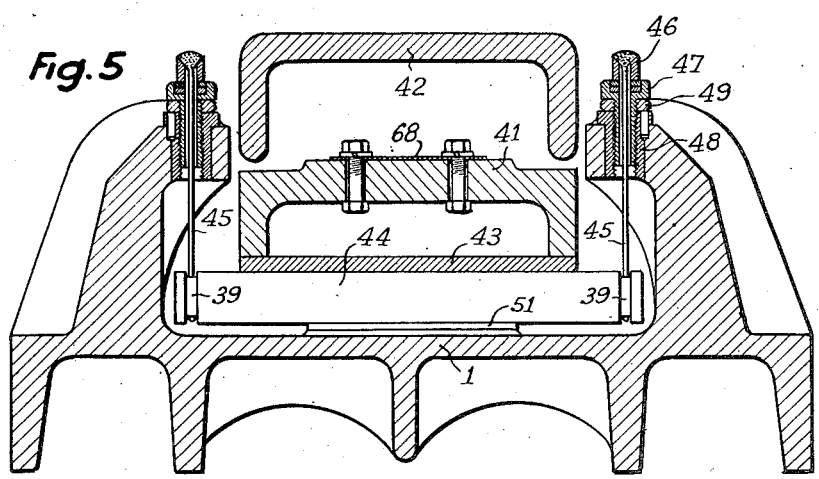
Fig. 5 is, also on an enlarged scale, a section along the lines V—V of Fig. 2.
Figure 6:
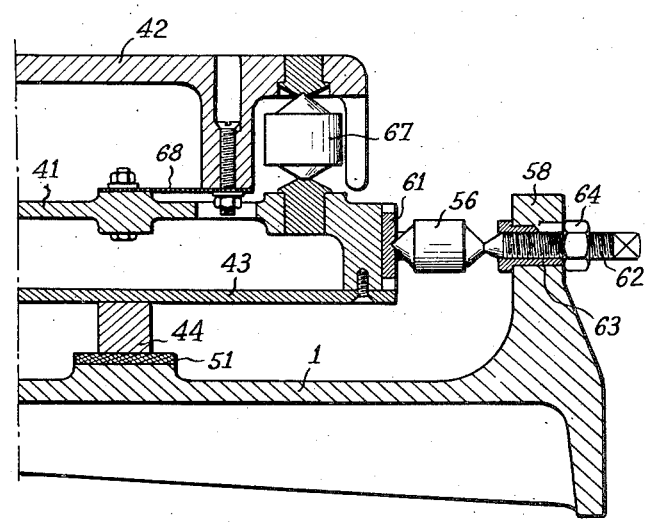

Fig. 6 on the same scale as that of Fig. 5 is a section on line VI—VI of Fig. 2; and Fig. 7 is a graphic showing, in a particular case of the curves indicating variations of muscular forces obtained and recorded by this apparatus.

Figure 1:
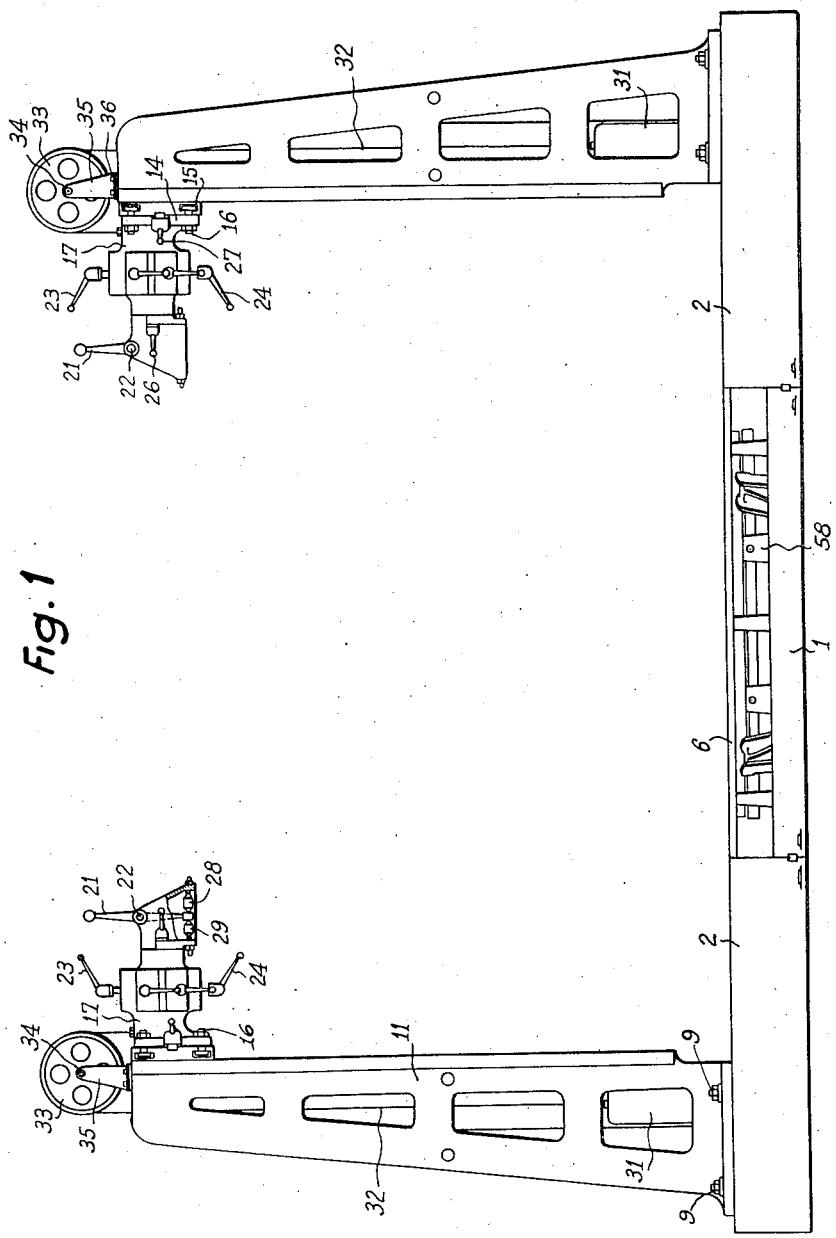
Fig. 1 is a front elevation of an apparatus for measuring muscular forces in accordance with the present invention.
Figure 3:
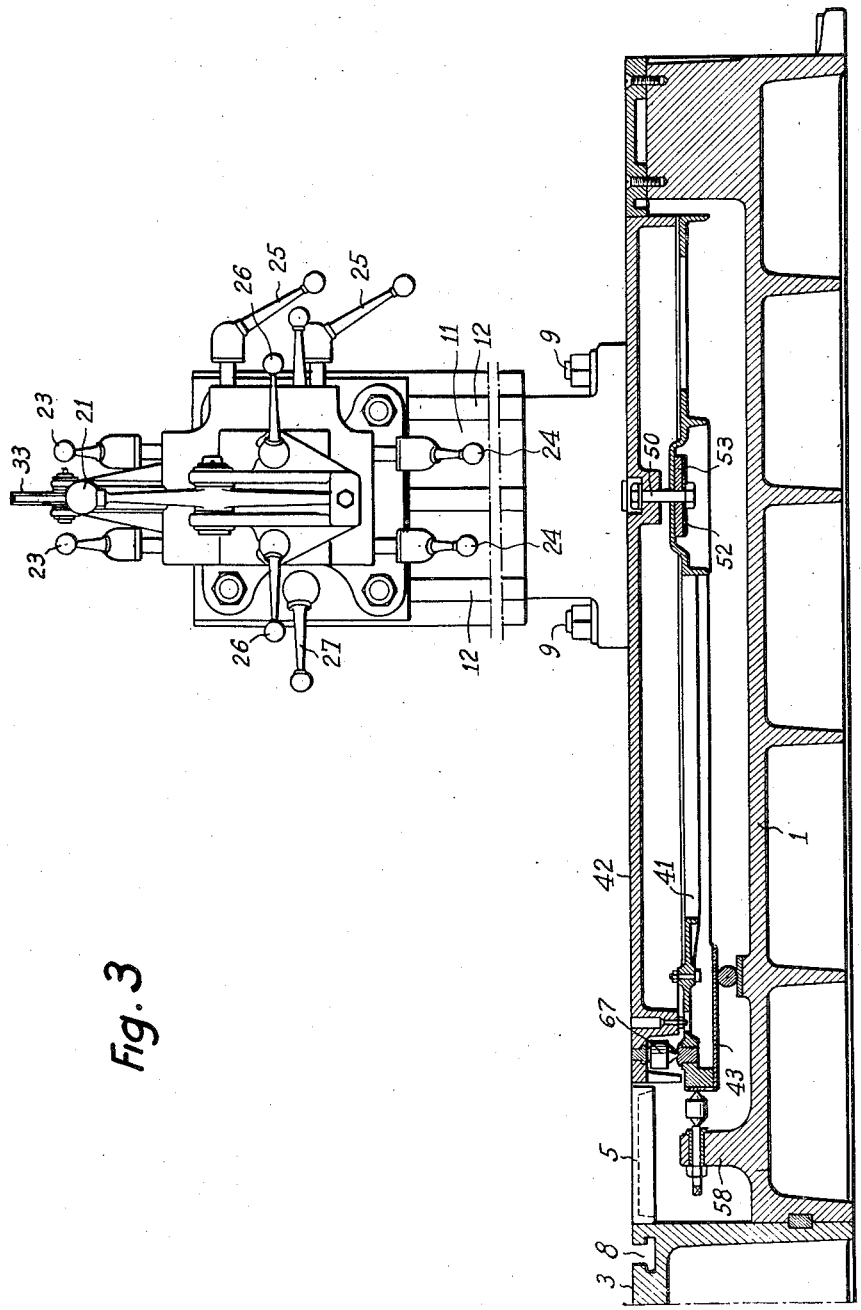
Fig. 3 is a section along the lines III—III of Fig. 2 on an enlarged scale, the column being shown in section.

Referring now to Figures 1 to 3 of the drawings, there is shown a structure comprising several elements, namely a base plate 1, two lateral elements 2 and an intermediate element 3 bolted against the base plate 1. The central part of the base plate 1 has a large hollow portion of generally triangular shape adapted to receive all the recording means and which portion is surrounded by a floor comprising two side elements 4 and 5 and a central element 6. The upper faces of the part of the base plate 1 which surround the floor of the intermediate element 3 and of the two lateral elements 2 are disposed in the same horizontal plane and have grooves 8 of T cross section, in which the heads of bolts such as 9 are received for securing to the base all elements or machine parts.

In the example shown in the drawings, a hollow column 11 is bolted on each of the side elements and has vertical grooves 12 of T cross section on one of its straight faces and which grooves 12 receive the heads of bolts 13 for supporting a plate 14. The plate 14 is also formed with horizontal grooves 15 of T cross section which grooves 15 receive the heads of bolts 16 for supporting a special head 17 having a handle 21 which is movable upon a horizontal pin 22.

Additional handles 23, 24, 25, 26 and 27, which control locking means, operate as securing means for the handle 21 or for all other measuring means over which the subject whose muscular forces are to be measured could exercise control.

This assembly can moreover occupy in the space all the positions permitted by the locking means controlled by the handles 23, 24, 25, 26 and 27.

It is to be understood that the arrangement of the handle 21 may be different. Moreover, several similar handles may be provided or each handle could be replaced by other measuring means.

Figure 4:
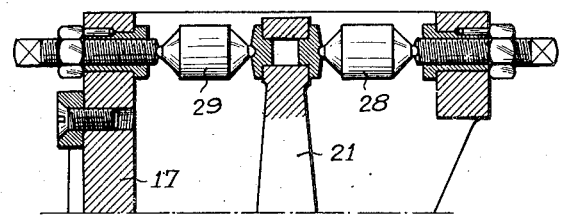
Fig. 4 is, also on an enlarged scale, a section along the lines IV—IV of Fig. 2.

In order to determine the value of the forces which will be exerted on the various necessary devices for the measurements required these devices may be provided with any suitable and conventional force measuring device, such as for example a device having two quartz pick-ups, such as are indicated at 28, 29 in Figures 1 and 4. The head 17 can be fixed at any desired height along grooves 12 (Fig. 3) of the column 11 by means of the bolts 16. The combined weight of the plate 14, the head 17 and all the elements carried by the latter is balanced by a counter weight 31 disposed inside the column 11 and connected to one end of a cable 32 the other end of which is anchored to the head 17. The cable 32 passes over a free running grooved pulley 33 mounted on an axle 34 which is supported by a frame 35 secured to the top of the column 11, by bolts 36.

The axial spacing of two bolts 9, securing the column 11 to the element 2 and which bolts 9 are located in the same groove, is equal to the axial spacing of two of these bolts placed in two different grooves. In other words these bolts are located at the apexes of a square on which one could place the column either in the position shown or in a position in which its base is turned by 90° in one direction or the other.

Moreover, all the grooves 8 of the element 2 are equidistant so that the column 11 can be located in whatever position is desired on the element 2.

In the arrangement shown in the drawings the two columns 11 and their equipment are symmetrical relative to the vertical median plane of symmetry of the entire apparatus passing through the line III—III of Figure 2.

The triangular hollow portion of the base plate 1 is filled by two members, also of generally triangular shape, namely a flat supporting member 41 and a platform 42.

In the bottom face of the flat suporting member 41, which is suitably ribbed, is secured a plate 43 (see also Figures 5 and 6) which rests on a suspension bar 44 carried at each of its ends in a groove 39, by the loop of a cable, 45, the two ends of which are expanded and welded into a ferrule 46. The two lengths of the cable 45 are threaded into a hollow dowel 47 adjustable for height by screw threading in a sleeve 48 force fitted into corresponding vertical grooves in the base plate 1. An abutment 49 screwed on the dowel 47 and bearing against the top end of the sleeve 48 enables the dowel 47 to be locked at the desired height in relation to the base plate 1. Indiarubber wedges 51 are inserted between the suspension bars 44 and the base plate 1 for absorbing shocks during transport of the apparatus.

The flat supporting member 41 is then supported at the three summits of the triangle which it forms by means of cables 45 which rigidly determine its vertical position but which allow it to move quite freely sideways to a greater or lesser extent for the lowest amplitudes which are required for measurement of the forces in the horizontal plane in the two perpendicular directions XX' and YY'. Thus, there are provided two groups of responsive elements or piezo-electric pick-ups. A first group comprises two pick-ups 54 and 55 arranged in the vertical plane extending through the center of gravity of the flat supporting member 41 (along the axis XX') for measuring transverse stresses for example. A second group comprises a pick-up 56 arranged on the axis YY' perpendicular to the first group in the plane of symmetry of the apparatus and two other pick-ups 57 disposed symmetrically with reference to the plane. These five pick-ups 54, 55, 56 and 57 are mounted similarly between the edge of the flat supporting member 41 and of the uprights 58 of the base plate 1 (see Figures 1, 2 and 6). One end of each of the pick-ups bears against a face plate 61 (Fig. 6) and the other end bears against the end of an adjusting screw 62 mounted in an abutment sleeve 63 which forces a filter into the upright 58 of the base plate 1. A locking nut 64 permits of adjustment of the screw bolt 62 in any position.

The platform 42 rests on the flat supporting member 41 through the intermediary of three piezo-electric pickups 67 (Figs. 3 and 6) disposed, respectively, at the three corners of the triangle. The lateral placing of the platform 42 on the flat supporting member 41 is ensured by a leaf spring 68 the two ends of which are secured to the flat supporting member 41 and the platform, respectively. These leaf springs 68 offer hardly any resistance to the vertical displacements of the platform 42 relative to the flat supporting member 41, because here again the amplitude of these displacements is imperceptible and in fact rather represents a pressure variation than an actual displacement. A bolt 50 passes through the center of gravity of the two plates and a washer 52 backed by a rubber disc 53 acts as a resilient buffer opposing separation of the two platforms.

In order that the value of the reactions to which the different piezo-electric pick-ups 54, 55, 56, 57 and 67 are subjected, may be measured, the latter are coupled to an observation and recording apparatus (not shown) of any suitable conventional type according to known designs, comprising for example electrometer stages sensitive to the tensions in the quartz crystals of the piezo-electric pick-ups, measurement amplifiers, measurement tubes, high frequency oscillators, repeater tubes, relaxation oscillators and their ancillary equipment.

The apparatus which has been described above functions as follows:

The person whose movements are to be analysed by measurement of the forces developed in the course of these movements places himself on the platform 42.

The vertical pick-ups 67 give the values of the variations of the forces set up according to the vertical component, while the pick-ups 54 and 55 on the one hand and the pick-ups 56 and 57 on the other hand give the values of the variations of the horizontal components in the two perpendicular directions, i. e. transverse XX' and frontal YY'. Then it is possible to observe and/or record simultaneously the instantaneous value of the stresses finally exerted on the handle 21 due to the pick-ups such as 28, 29.

In order to utilize the apparatus a preliminary calibration as a function of the amplifier used is necessary. Then the assembly is set to zero when the subject is on the platform so as to allow for the weight of the subject. The slightest movement, which the subject makes, results in variations of pressure on the pick-up of the tri-rectangular components (vertical, longitudinal and transverse).

In order to avoid misjudging the magnitude of the forces measured, it is necessary to conserve the quantities of electricity released by the quartz of the pick-ups and in consequence to eliminate even the slightest leakage. For this reason it is preferable to use an electrometer for measuring the potential differences created. An inertia-free electrometer is constituted by a thermionic lamp electrometer the grid cathode resistance of which is more than $10^{15}$ ohms. The anode current variations of this lamp can be observed and/or recorded through the intermediary for example of a cathode oscillograph.

With the apparatus of the present invention all phases of a movement can be analysed in detail and those actions which result in useless expenditure of energy can be deduced. There can thus be determined which are the most necessary and sufficient actions for the rational accomplishment of a given task.

By way of example Figure 7 shows the reactions to which the apparatus platform is submitted when a subject supported on this platform bends down, remains a moment in a bent position and then stands up again (positions $a$, $b$, $c$, $d$, $e$, $f$, $g$). The axes $OX_1$, $OX_2$ and $OX_3$ are situated below some diagrams of the positions of the subject and at each corresponding point of these axes there is indicated respectively the vertical, frontal and transverse components to which the platform is submitted at each instant. In other words the three axes $OX_1$, $OX_2$, $OX_3$ are the time axes and along the ordinates the forces are inscribed in kilograms. At rest (columns *a* and *g*) all the components are nil. On the vertical component $X_1$ the zero corresponds to the weight of the subject. The longitudinal components $X_2$ and transverse components $X_3$ only vary a slight amount in the course of this movement, taken by way of example.

The vertical component will now be considered separately.

At the beginning of the bending movement (column *b*) the subject develops forces for drawing his body downwards this is the wave motion.

To stop the bending (column *c*) the contrary muscles act as a brake to limit the movement; this second part of the curve is the braking wave.

When he is bent (column *d*) the subject exerts on the platform a pressure equal to his weight. Then when he recovers himself the driving and subsequent braking effort which he develops successively gives rise to a positive reaction followed by a negative reaction on the platform, the subject then returning to the original position (column *g*) where the platform reassumes its initial state.

This very simple analysis is only by way of example to facilitate understanding of the mode of functioning of the apparatus but it will be appreciated that the latter permits of the analysis of more complex movements by studying components in the three spatial directions.

While I have disclosed one embodiment of the present invention, it is to be understood that this embodiment is given by example only and not in a limiting sense, the scope of the present invention being determined by the objects and the claims.

I claim:

1. An apparatus for measuring the muscular efforts of a subject, comprising in combination a horizontal base plate, a flat supporting member suspended on said base plate in a plane parallel thereto and spaced apart therefrom by means of flexible cables for free lateral movements of limited amplitude of said supporting member in its own plane, a platform adapted to receive a subject and resting upon said flat supporting member by means of supporting elements interposed therebetween, frictionless linking means connecting said platform and said supporting member in such a manner as to allow only vertical relative movement of said platform and of said supporting member, first pressure-sensitive means inserted between said platform and said supporting member for measuring the vertical pressure exerted upon said supporting member by said platform and the subject standing thereon, and second pressure-sensitive means inserted between said supporting member and said base plate and operative in two horizontal directions disposed perpendicularly relative to each other for measuring the horizontal pressures exerted in both said directions by the subject through the intermediary of said platform and said supporting member.

2. The apparatus, as set forth in claim 1, wherein said first pressure-sensitive means are constituted by said supporting elements.

3. The apparatus, as set forth in claim 1, wherein said first pressure-sensitive means are constituted by three of said supporting elements disposed in triangular formation.

4. The apparatus, as set forth in claim 1, wherein said flexible cables are attached to said supporting member in three zones thereof arranged in triangular formation.

5. The apparatus, as set forth in claim 1, wherein said flexible cables are attached to said supporting member in three zones thereof arranged in triangular formation, and wherein said first pressure-sensitive means are constituted by three of said supporting elements disposed in triangular formation on said supporting member.

6. The apparatus, as set forth in claim 1, wherein said frictionless linking means are constituted by leaf springs, each of said leaf springs having one end thereof secured flat against said platform and the other end thereof secured flat against said supporting member.

7. The apparatus, as set forth in claim 1, wherein said base plate is formed with a recess adapted to receive said supporting member and said platform, the depth of said recess being of such dimension that the upper face of said platform is flush with the upper face of said base plate.

8. The apparatus, as set forth in claim 1, wherein said platform and said supporting member are of triangular shape and substantially equal in dimensions, said supporting elements and said suspension cables being disposed near the corners thereof, said second pressure-sensitive means operative in one of said two horizontal directions being positioned on a line extending through the center of gravity of said supporting member and parallel with one side thereof, while said second pressure-sensitive means operative in the other of said two horizontal directions are arranged near the corner of the triangle remote from said side and are symmetrically arranged on either side of the middle point of said triangle, respectively.

9. The apparatus, as set forth in claim 1, which includes a tie-rod extending through said platform and said supporting member and having portions in abutting relation thereto, in order to limit the vertical movement of said platform relative to said supporting member.

10. The apparatus, as set forth in claim 1, wherein said pressure-sensitive elements are constituted by piezo-electric elements.

11. The apparatus, as set forth in claim 1, which includes at least one column supported on said base plate, at least one manually operable handle carried by said column, said column being so positioned on said base plate and said manually operable handle being disposed on said column in such manner that said handle may be grasped by a subject standing on said platform.

12. The apparatus, as set forth in claim 11, which includes a head, means for vertical adjustment of said head on said column, and said manually operable handle is mounted on said head.

13. The apparatus, as set forth in claim 11, wherein said column is disposed on said base plate of said platform, in order to permit of gripping of said handle in the hand of a subject standing on the platform.

14. The apparatus, as set forth in claim 11, which includes means for measuring the efforts being exerted by said subject upon said handle.

15. The apparatus, as set forth in claim 14, wherein said measuring means comprises piezo-electric elements.

References Cited in the file of this patent

UNITED STATES PATENTS

| | | |
|---|---|---|
| 1,981,613 | Duby | Nov. 20, 1934 |
| 2,054,787 | Beavers | Sept. 22, 1936 |
| 2,430,702 | Bohannan | Nov. 11, 1947 |
| 2,448,528 | Heuver | Sept. 7, 1948 |
| 2,688,873 | Burris-Meyer | Sept. 14, 1954 |